United States Patent [19]

Mason et al.

[11] Patent Number: 4,744,000
[45] Date of Patent: May 10, 1988

[54] ELECTRICAL CAPACITOR HAVING IMPROVED DIELECTRIC SYSTEM

[75] Inventors: Marco J. Mason, Racine; Gary A. Gauger, Franklin; Paul F. Hettwer, Greenfield, all of Wis.; William M. Hurst, Greenwood, S.C.

[73] Assignee: Cooper Industries, Inc., Houston, Tex.

[21] Appl. No.: 79,067

[22] Filed: Jul. 29, 1987

[51] Int. Cl.[4] .......................... H01G 4/22; H01B 3/48
[52] U.S. Cl. ..................................... 361/315; 252/567
[58] Field of Search ................ 361/314, 315; 252/567

[56] References Cited

U.S. PATENT DOCUMENTS

| | | | |
|---|---|---|---|
| 4,054,937 | 10/1977 | Mandelcorn et al. | 361/315 X |
| 4,320,034 | 3/1982 | Lapp et al. | 361/315 X |
| 4,348,713 | 9/1982 | Grahame | 361/314 X |
| 4,420,791 | 12/1983 | Shedigian | 361/315 X |

FOREIGN PATENT DOCUMENTS 3127905  2/1983  Fed. Rep. of Germany ...... 252/567

Primary Examiner—Donald A. Griffin
Attorney, Agent, or Firm—Nelson A. Blish; Eddie E. Scott; Alan R. Thiele

[57] ABSTRACT

An electrical capacitor (10) having an improved dielectric system. The capacitor includes layers of metal foil (15,16) and dielectric sheet material (17) which is impregnated with a liquid dielectric composed of a mixture of phenyl xylyl ethane and phenyl tolyl methanes.

10 Claims, 2 Drawing Sheets

ELECTRICAL CAPACITOR HAVING IMPROVED DIELECTRIC SYSTEM

BACKGROUND OF THE INVENTION

This application relates to electric capacitors in general and, in particular, to an improved dielectric fluid for capacitors.

In the past, polychlorinated biphenyls were widely used as an impregnating liquid in electrical devices including power capacitors. The liquid served as an insulating medium to prevent partial breakdown in the spaces between the solid members of the dielectric. If these spaces were not filled with a good dielectric material, partial discharges would occur under electrical stress and the device would soon fail. Environmental problems with the polychlorinated biphenyls, however, led to a search for alternatives.

More recent capacitor dielectric fluids include such materials as isopropyl biphenyl as disclosed in U.S. Pat. No. 4,054,937, or phenyl xylyl ethane. Other dielectric fluids which have been disclosed as suitable for use as a capacitor dielectric include a mixture of methyl diphenyl ethane and lower alkyl diphenyl as disclosed in U.S. Pat. No. 4,320,034 and mono and dibenzyltoluene(-phenyl tolyl methanes) as disclosed in Japanese Patent Specification 55-5689. Isopropyl biphenyl is currently used by one U.S. manufacturer of power factor correction capacitors, phenyl xylyl ethane by another and a third manufacturer uses a mixture of both of these two fluids.

While the above dielectric fluids operate satisfactorily, it is desirable to have a dielectric with increased partial discharge inception voltage. This would allow the operating stress of the capacitor to be increased because of improved partial discharge characters. This in turn reduces the amount of materials required to make the device and, as a result, reduces the cost of the device.

SUMMARY OF THE INVENTION

According to the present invention, an electrical capacitor having an improved dielectric system is composed of alternate layers of metal foil and solid dielectric sheet material such as polyoelfin film. The spaces between the solid members, as well as the dielectric sheet material itself, are impregnated with a liquid dielectric composition composed of a mixture of phenyl xylyl ethane and phenyl tolyl methanes. In addition, the composition may contain small amounts of an anti-oxidant or an epoxide scavenger.

The capacitor of the invention has a higher discharge inception voltage over the normal operating temperature range than those made with the singular components of the mixture.

The dielectric composition used in the capacitor of this invention exhibits improved partial discharge characteristics, particularly at low temperatures. Such characteristics at low temperatures have been a limiting factor in increasing the nominal electrical stress which may be applied. The improved partial discharge characteristics of this invention allow the electrical stress of the capacitor dielectric system to be increased without any reduction in low temperature performance.

DETAILED DESCRIPTION OF THE INVENTION

Figures 1, 2:
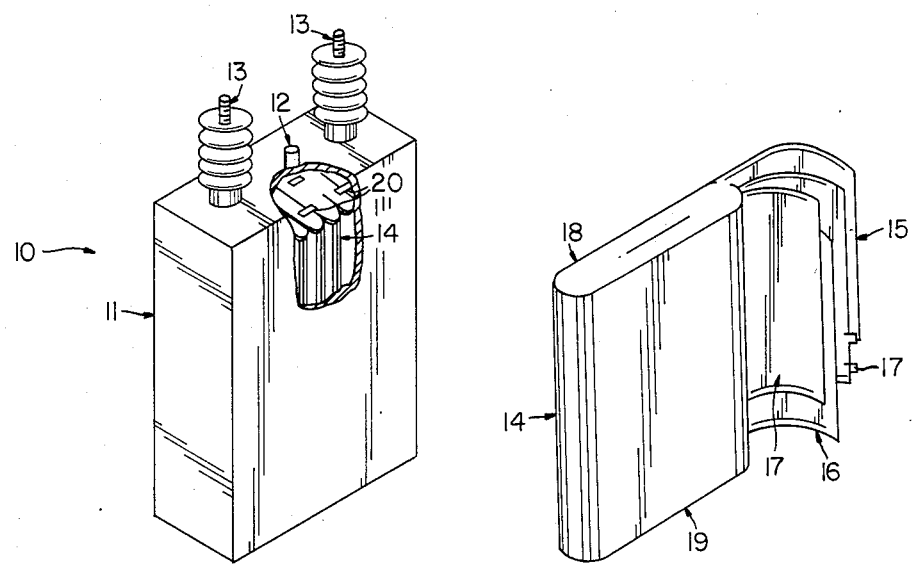
FIG. 1 is a perspective view of a typical capacitor constructed in accordance with the invention.
FIG. 2 is a perspective view of a capacitor pack.

FIG. 1 illustrates a typical capacitor comprising an outer casing 11 enclosing a multitude of capacitor packs 14. In service the casing is hermetically sealed. A fill tube 12 is provided at the top of the casing to allow vacuum drying of the capacitor and subsequent introduction of the dielectric liquid. The tube is crimp-closed after processing. A pair of terminals 13 project through the top of the casing and at least one is insulated from the casing. The terminals provide connection of the capacitor to an electrical system.

As illustrated in FIG. 2, the capacitor pack 14 includes at least two convolutely-wound layers of metal foil 15, 16 separated by a dielectric layer 17. The foil layers are shifted with respect to the dielectric layers and with respect to each other such that one foil 15 extends beyond the dielectric layer 17 at the top of the pack 18 and the other foil 16 extends beyond the dielectric layer 17 at the bottom of the pack 19. The packs are connected together by a crimp 20 which holds the extended portion of the foil layers of one pack in intimate contact with the extended foil layers of adjacent packs. The extended portion of the foils from some packs are insulated from that of adjacent packs to provide series arrangement of the packs. Lead wires, not shown, attached to crimps near the end packs provide electrical connection of the packs to the outside terminals 13.

The foil layers 15, 16 can be formed of any desired electrically conductive material such as aluminum or copper. The dielectric layers can be composed of polymeric film or kraft paper. The polymeric film may be polypropylene, polyethylene, polyester, polycarbonate, or the like. It is important that a surface of the polymeric film 17 or the contiguous surface of the metal foils 15, 16 have surface irregularities or deformations so that a space is provided which enables the liquid dielectric to reach and thoroughly impregnate the polymer film.

The spaces between the conductive foils and the dielectric layers, as well as the dielectric layers themselves, are impregnated with a liquid dielectric which is composed of a mixture of about 5 to 95% by weight of phenyl xylyl ethane (PXE) and 95 to 5% by weight of phenyl tolyl methanes. A mixture of about 20% to 80% of the phenyl xylyl ethane and 80% to 20% of the phenyl tolyl methanes (PTM) is preferred.

The phenyl xylyl ethane has the following chemical structure:

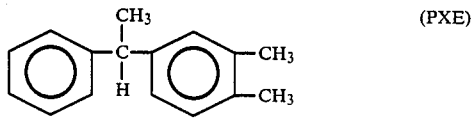

(PXE)

The phenyl tolyl methanes have the following general structure:

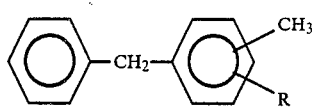

R = H, —CH₂ phenyl

Where 50% to 95% by weight of the phenyl tolyl methanes has R=H, that is with a structure of

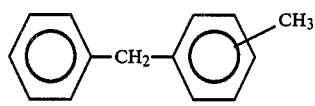

(mono benzyl toluene)

And where 50% to 5% by weight of the phenyl tolyl methanes has R=—CH₂ phenyl that is with the structure,

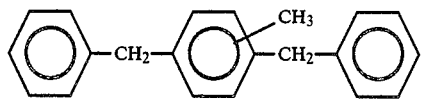

(di benzyl toluene)

No special procedures are required for mixing the two components of the dielectric liquid composition and they are miscible at room temperature and at elevated temperatures.

The dielectric composition can also include up to 5.0% by weight, and preferably from about 0.1% to 1.5% by weight of an epoxide scavenger which will act to neutralize decomposition products that are released from or generated from the liquid impregnant and other materials in the capacitor during its operation. The neutralizing agents or scavengers can take the form of 1,2-Epoxy-3-Phenoxy Propane; Bis(3,4-Epoxycyclohexylmethyl) Adipate; 3,4-Epoxycyclohexylmethyl-(3,4-epoxy)cyclohexane carboxylate; Bis(3,4-Epoxy-6-methycyclohexylmethyl) Adipate; 3,4 Epoxy-6-methylcyclohexylmethyl-4-epoxy-6-methylcyclohexane carboxylate; diglyadyl ethers of Bisphenol A; or similar compounds. The epoxy compounds are effective to rapidly-neutralize decomposition products, thereby improving the dielectric properties and service life of the capacitor.

The dielectric composition can also include up to about 1.0% of an anti-oxidant, and preferably about 0.01% to about 0.2%. Anti-oxidants that can be used are di-t-butylphenol, di-t-butyl-paracresol, and the like. In addition, the dielectric composition can also contain up to about 2% and preferably about 0.01% to 0.5% of an agent to improve the corona resistance, such as anthraquinone, Beta-methylanthraquinone or Beta-methylanthraquinone or Beta-chloranthraquinone.

In processing the capacitor, according to the present invention, the capacitor casing containing the capacitor packs is initially vacuum dried at a temperature preferably less than 60° C. for a period of time sufficient to remove water vapor and other gases from the interior of the capacitor. A vacuum less than 500 microns is usually employed, and preferably below 100 microns, and a drying period longer than 40 hours is customary, although the time period depends on the magnitude of the vacuum.

The liquid dielectric composition is separately subjected to a vacuum treatment to remove gases, and in this degassing treatment, a vacuum less than 200 microns is utilized, with a vacuum less than 100 microns being preferred. To accelerate the degassing, the liquid can be agitated either by circulating the liquid through a closed system, or subjecting it to stirring or mixing action. The time of degassing depends upon the viscosity of the liquid, the magnitude of the vacuum and the type of agitation. In general, the liquid is subjected to the vacuum treatment for a period in excess of 12 hours and during degassing is maintained at a temperature below 60° C., and preferably at room temperatue.

The degassed dielectric liquid composition is then introduced into the evacuated capacitor casing. After filling and a suitable vacuum soak of four hours, a positive pressure in the range of about 0.1 to 5.0 psig is applied to the dielectric liquid. THe positive pressure will result in the walls of the casing being bulged or expanded, within its elastic limit, to provide a slight increase in volume in the interior of the casing. THe positive pressure is maintained on the liquid for a period of about 6 hours or more and the casing is thereafter sealed while maintaining some positive pressure.

As an example of the construction and processing of capacitors of this invention, four 7.2 kV 200 kVAR full-size power capacitors were constructed having a casing size of about 13½×4¼×22⅞ inches.

The packs of the subject capacitors consisted of convolutely-wound layers of 0.00023 inch thick aluminum foil separated by two sheets of polypropylene film having a combined thickness of about 0.00120 inch.

Each unit contained 16 packs banded in kraft paper major insulation prior to insertion into the casing. The extended foil edges of the packs were crimped together to provide 4 series groups with 4 packs per series group. The voltage applied across each pack at the rated unit voltage of 7200 volts was therefore 1800 volts. This results in a nominal dielectric stress of 1500 v/mil.

The capacitors were placed in an oven and heated to a temperature of about 60° C. At the same time, the interior of the casing was evacuated by connection to a vacuum pump. Gases and vapors were extracted from the capacitor for a period of three days. By this time, the header to which the capacitors were attached had exhibited a vacuum level of less than 20 um for a period in excess of 16 hours. The capacitors were then filled with dry nitrogen and allowed to cool to room temperature. The units were removed from the oven and moved to a laboratory impregnation system, where a hard vacuum was again established. The capacitors remained under a vacuum of less than 100 um at room temperature until impregnation.

The dielectric liquid consisted of one 55 gallon drum of phenyl xylyl ethane obtained from a production storage tank and one similar drum of phenyl tolyl methanes (Ugilec C-100, Prodelec of France) which were added to a 250 gallon laboratory supply tank. The supply tank was evacuated by means of a mechanical pump to a level of about 60 um while the fluid was circulated through a clay and particle filter.

After circulating through the filters for 24 hours, about 1% by weight of an epoxide scavenger (ERL-4299, Union Carbide Co.) was added to the fluid. The fluid was then circulated through the particle filter for another 24 hours.

The fluid under vacuum and at room temperature was then pumped to the capacitors also under vacuum and at room temperature and allowed to completely fill the casing.

A head pressure from the pump was used to establish a positive pressure of 2 psig on the fluid at the capacitors which was maintained for a period in excess of 16 hours. The capacitors were then sealed off by crimping the fill tube closed (while still under a pressure of 2 PSI). The capacitors were room temperature cured for a period of about two days before testing to allow the fluid to penetrate and impregnate the film. These capacitors completed all production tests and design-type tests in a successful manner.

To investigate the characteristics of the dielectric system more fully, minicapacitor samples were also constructed. Minicapacitors utilize the same dielectric configuration and material thickness as full-size units, except they are made with a considerably reduced area. The small size of such capacitors allow a variety of tests to be performed under controlled laboratory conditions, including the determination of partial discharge inception voltage levels.

Minicapacitor samples were constructed and processed utilizing the fluid mixture of this invention (PXE/PTM mix). Additional minicapacitor samples were also constructed which were processed with the individual components separately.

Tests were conducted on the minicapacitor samples to determine the voltage at which partial discharges occur; the partial discharge inception voltage (DIV). The DIV is a primary limiting design parameter of a capacitor since operation at this voltage will quickly lead to failure. In reality, the normal operating voltage applied to capacitors is selected so that the DIV will be at least 180% of the operating voltage at room temperature. This insures that the capacitor will not be excessively exposed to such damaging discharges under normal operating conditions.

Figure 3:
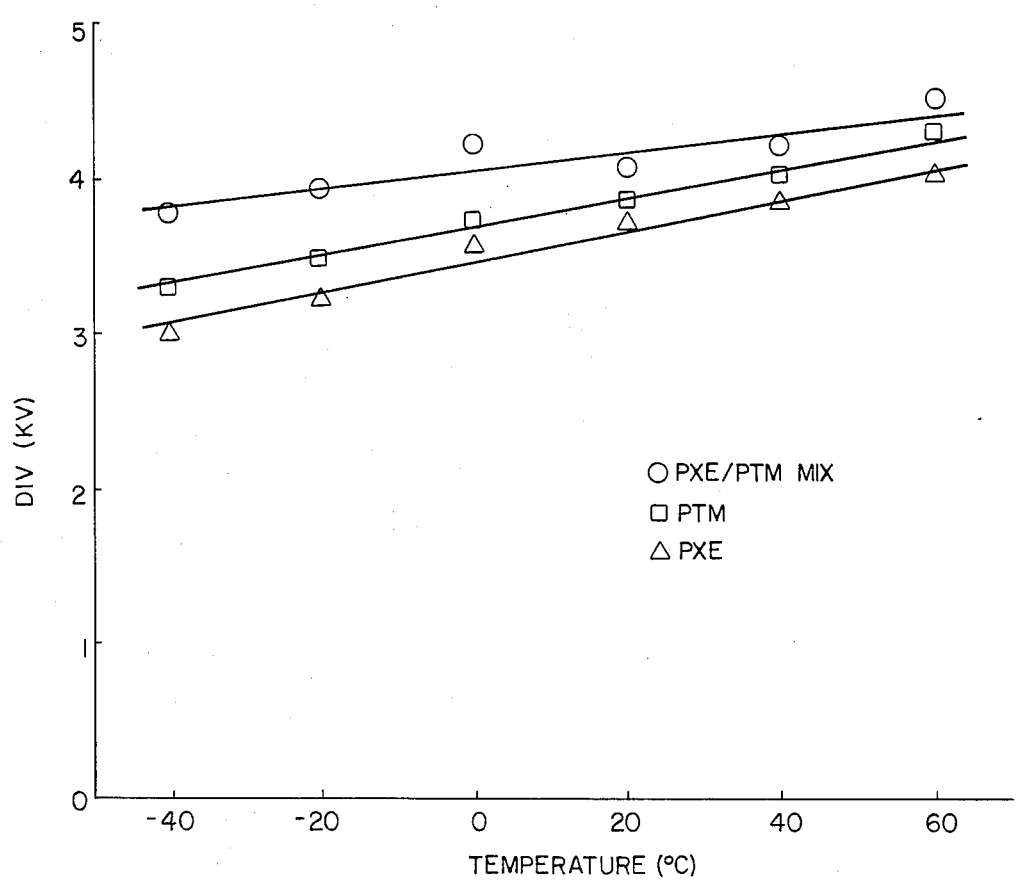
FIG. 3 is a graph comparing the discharge inception voltage (DIV) of the dielectric liquid composition of this invention with that of its originating components over the temperature range of −40° to +60° C.

The DIV of capacitors impregnated with the PXE/PTM mix is shown in FIG. 3 as a function of temperature. The figure shows the average value of several samples measured at temperatures from −40° to +60° C., the normal operating temperature range of power capacitors. The data is also represented by a straight line least squares fit over this temperature range. Similar data is also shown in FIG. 3 for equivalent minicapacitors which were processed with the individual components of the fluid (PXE and PTM) alone.

Unexpectedly, the DIV values of the mixture were consistently higher than that of the individual components. The least squares fit line of the DIV for the samples impregnated with the mixture was not only higher that that of the PXE and PTM alone, but was also flatter (i.e., lower slope) which means that the DIV of the samples with the mixture was more stable with respect to temperature.

Since the DIV of the mixture is greater than that of the components at room temperature, these results would indicate that a capacitor impregnated with a mixture of PXE and PTM could be operated at a higher voltage per unit dielectric thickness (stress) than capacitors impregnated with PXE or PTM alone, while still maintaining a 180% safety factor between the operating voltage and the discharge inception voltage. Such capacitors would require less material and would therefore be less expensive to construct.

In addition, such capacitors processed with the fluid mixture would provide better low temperature performance since the DIV of the mixture decreases less as the temperature decreases.

Figure 4:
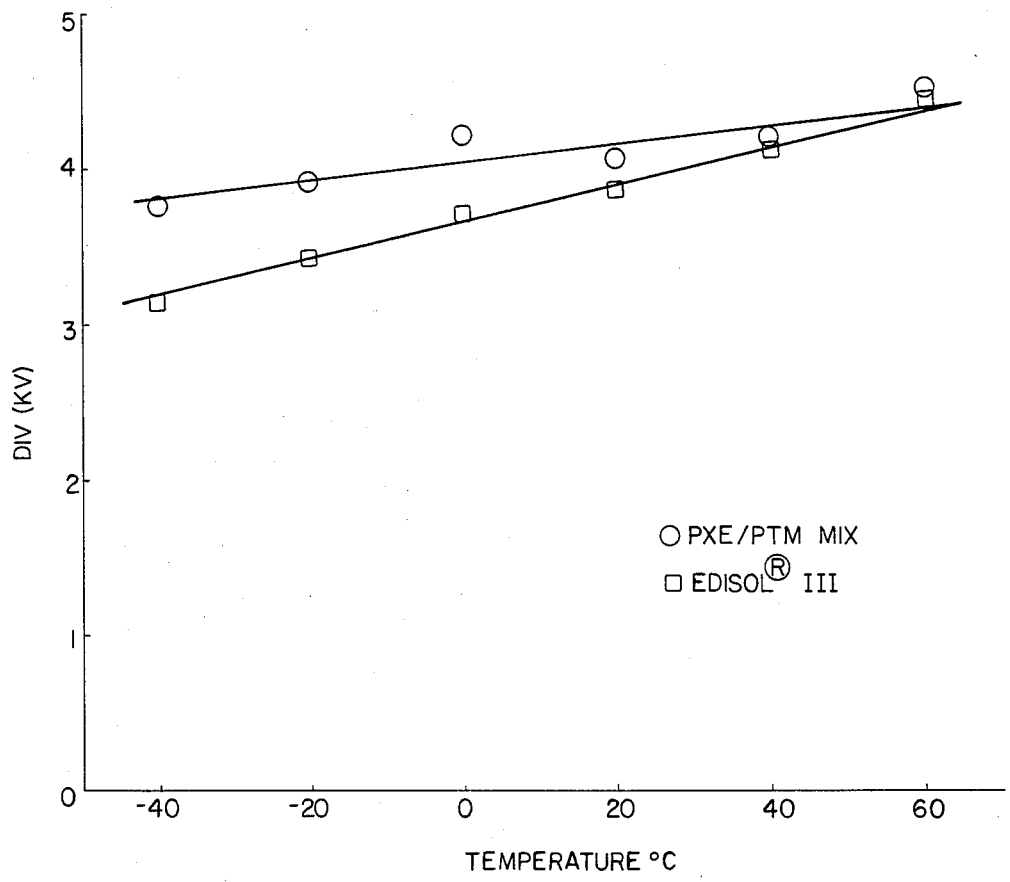
FIG. 4 is a graph comparing the DIV of the dielectric liquid composition of this invention with that of a commercially used fluid.

The performance of the PXE/PTM mixture was also evaluated with respect to a capacitor dielectric fluid which is currently used in the manufacture of present day power capacitors; MCGraw-Edison's Edisol III fluid. A comparison of the DIV of th PXE/PTM mixture with that of Edisol III is shown in FIG. 4. This figure also shows the mixture to be superior to Edisol III except perhaps near 60° C. It also shows that the DIV of the fluid of this invention remains high over the normal operating temperature range, particularly at low temperatures.

As the components of the dielectric liquid composition are biodegradeable and of low toxicity, no environmental problems are likely in the use and ultimate disposal of the fluid.

Although the discussion of this invention relates primarily to power factor correction capacitors, it could be similarly advantageous when utilized in other capacitor applications such as energy storage capacitors, filter capacitors, high current discharge capacitors, as well as other electrical devices which require a dielectric insulating liquid to limit the occurrence of partial discharges in the spaces between conductors of differing electrical potential.

We claim:

1. An electrical capacitor comprising an outer casing and capacitor packs disposed within the casing having alternate layers of metal foil and a solid dielectric material, said solid dielectric material being impregnated with a dielectric liquid composition comprising:

(a) 5 to 95% by weight of Phenyl xylyl ethane (PXE); and
   (b) 95 to 5% by weight of Phenyl tolyl methanes (PTM).

2. The capacitor of claim 1 wherein the PTM consists of 50 to 95% by weight of monobenzyl toluene and 5 to 50% by weight of dibenzyl toluene.

3. The capacitor of claim 1 wherein said solid dielectric material is selected from the group consisting of polymeric film, paper and mixtures thereof.

4. The capacitor of claim 1 wherein said dielectric liquid includes up to 5% by weight of an epoxide scavenger.

5. The capacitor of claim 1 wherein said dielectric liquid composition contains from about 0.01% to 1% by weight of an anti-oxidant.

6. An electrical capacitor comprising an outer casing an capacitor packs disposed within the casing having alternate layers of metal foil and dielectric material, said dielectric material being impregnated with a dielectric liquid composition comprising;

(a) 20 to 80% by weight of Phenyl xylyl ethane (PXE); and
   (b) 80 to 20% by weight of Phenyl tolyl methanes (PTM).

7. The capacitor of claim 6 wherein the PTM consists of 50 to 95% by weight of mono benzyl toluene and 5 to 50% by weight of dibenzyl toluene.

8. The capacitor of claim 6 wherein said metal foil is aluminum foil and said dielectric material is selected from the group consisting of polymeric film, paper and mixtures thereof.

9. The capacitor of claim 6 wherein said dielectric liquid includes up to 5% by weight of an epoxide scavenger.

10. The capacitor of claim 6 wherein said dielectric liquid includes from 0.01 to 1% by weight of an anti-oxidant.

* * * * *